(12) United States Patent
Sprouse (10) Patent No.: US 7,085,360 B1
(45) Date of Patent: Aug. 1, 2006

(54) SYSTEM AND METHOD FOR AUDITING BILLING RECORDS IN A TELECOMMUNICATIONS SYSTEM

(75) Inventor: Mark William Sprouse, Duluth, GA (US)

(73) Assignee: Cingular Wireless, LLC, Atlanta, GA (US)

( * ) Notice: Subject to any disclaimer, the term of this patent is extended or adjusted under 35 U.S.C. 154(b) by 405 days.

(21) Appl. No.: 10/419,376

(22) Filed: Apr. 21, 2003

Related U.S. Application Data (60) Provisional application No. 60/374,325, filed on Apr. 22, 2002.

(51) Int. Cl.
*H04M 15/00* (2006.01)
(52) U.S. Cl. .............................. 379/114.04; 379/114.03; 379/121.05; 379/126
(58) Field of Classification Search ........... 379/114.01, 379/114.03, 114.04, 114.15, 116, 118, 119, 379/121.04, 121.05, 126, 135; 455/405, 455/406, 407, 408; 705/52, 75, 24, 34, 40, 705/404
See application file for complete search history.

(56) References Cited

U.S. PATENT DOCUMENTS

| | | | | |
|---|---|---|---|---|
| 6,016,340 A * | 1/2000 | Bayraktar | .............. | 379/114.04 |
| 6,385,301 B1* | 5/2002 | Nolting et al. | ........... | 379/32.01 |
| 6,385,444 B1* | 5/2002 | Peschel et al. | .............. | 455/405 |
| 6,665,386 B1* | 12/2003 | Klose et al. | ........... | 379/112.01 |
| 6,798,871 B1* | 9/2004 | Richardson | ............ | 379/114.04 |
| 6,804,337 B1* | 10/2004 | Anderson et al. | ...... | 379/114.06 |
| 6,891,938 B1* | 5/2005 | Scott et al. | ............ | 379/112.06 |
| 2003/0036918 A1* | 2/2003 | Pintsov | ......................... | 705/1 |

FOREIGN PATENT DOCUMENTS

WO    WO 99/16206    1/1999

* cited by examiner

*Primary Examiner*—Quoc Tran
(74) *Attorney, Agent, or Firm*—Gardner Groff Santos & Greenwald, PC (57) ABSTRACT

A system and method for auditing billing records in a telecommunications system. The method retrieves first data records from an origination device and second data records from a billing generation device; retrieves billing records from a billing device; compares the first data records with the second data records and with the billing records; generates a first error log of data records that appear in the first data records but not in the second data records; and generates a second error log of data records that appear in the second data records but not in the billing records.

13 Claims, 6 Drawing Sheets

SYSTEM AND METHOD FOR AUDITING BILLING RECORDS IN A TELECOMMUNICATIONS SYSTEM

RELATED APPLICATION

Filing priority is claimed to U.S. Provisional Application Ser. No. 60/374,325, filed Apr. 22, 2002, the entire disclosure of which is incorporated herein by reference.

FIELD OF THE INVENTION

The present invention relates to the field of auditing, and more specifically, to a system and method for auditing billing records in a telecommunications system.

BACKGROUND OF THE INVENTION

An increasing number of services and product offerings makes for greater complexity in customer billing, with a comparable impact on the opportunity to introduce errors into bill generation. In order to monitor and improve accuracy in billing, telecommunications carriers perform audits, or reconciliations, of their customer bills.

In the prior art, a telecommunications billing audit commonly consists of comparing call data records (CDR's) from a telecommunications switch against billed records in customer bills. A call data record is well known to those skilled in the art and may comprise, for example, call start time, call stop time, call duration, origination number and destination number. This process in the prior art is known as "switch to bill reconciliation," and involves a one-way comparison of each CDR to determine if a similar billed record appears in a customer bill. Any CDR's that do not appear in a billed record would be reported as an error, as representing an unbilled call.

However, the prior art switch to bill reconciliation has several deficiencies. First, the comparison is only a one-way comparison in that there is not a validation that each billed record actually arose from a CDR. Therefore, erroneous billed records may appear and be charged to a customer when a call was never actually placed or received. Second, switch to bill reconciliation fails to account for a situation where a single billed record may appear to match more than one CDR. Should more than one CDR match a single billed record, the switch to bill reconciliation system would erroneously think that each CDR had been billed. Third, should a CDR not appear in a billed record, prior art switch to bill reconciliation systems failed to detect where, in the complex chain of transactions from CDR to billed record, the transaction was lost.

Thus, there is a need in the art for a system and method for auditing billing records in a telecommunications system that incorporates greater accuracy checking than the one-way comparison existing in the prior art. There is also a need for a system and method for auditing billing records in a telecommunications system that provides for the possibility that a single billed record matches more than one CDR. There is also a need for a system and method for auditing billing records in a telecommunications system that detects when a transaction is lost while creating a billing record from a CDR. Embodiments of the present invention are directed at overcoming one or more of the above deficiencies in the prior art.

SUMMARY OF THE INVENTION

In accordance with the invention, a system for and method of auditing billing records in a telecommunications system is provided. The method retrieves first data records from an origination device and second data records from a billing generation device; retrieves billing records from a billing device; compares the first data records with the second data records and with the billing records; generates a first error log of data records that appear in the first data records but not in the second data records; and generates a second error log of data records that appear in the second data records but not in the billing records.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed. The accompanying drawings, which are incorporated in and constitute a part of this specification, illustrate embodiments of the invention and together with the description, serve to explain the principles of the invention.

BRIEF DESCRIPTION OF THE DRAWINGS

Preferred and alternative embodiments will now be described with reference to the attached figures wherein like reference numerals indicate similar or identical features or functions, and wherein.

DETAILED DESCRIPTION

Reference will now be made in detail to exemplary embodiments consistent with the principles of the present invention, examples of which are illustrated in the accompanying drawings. Wherever possible, the same reference numbers will be used throughout the drawings to refer to the same or like parts.

Exemplary embodiments consistent with the present invention perform audits on a billing system by collecting data records from one or more devices within a bill generation chain and running comparisons with billing records. The bill generation chain comprises one or more devices that facilitate the collection and aggregation of call data records from origination devices, such as switches, short message service centers, and/or base stations, through bill imaging and distribution devices which generate billing records. After or during the collection of data records, the data records from the one or more devices are compared to verify that call data records are accurately reflected within the billing records. As the comparison occurs, as call data records fail to pass through the generation chain, error logs for each device within the bill generation chain are created and updated. Following the comparison, any billing records that do not correspond to call data records are reported in an error log. Various reporting features may also be supported by the system.

Figure 1:
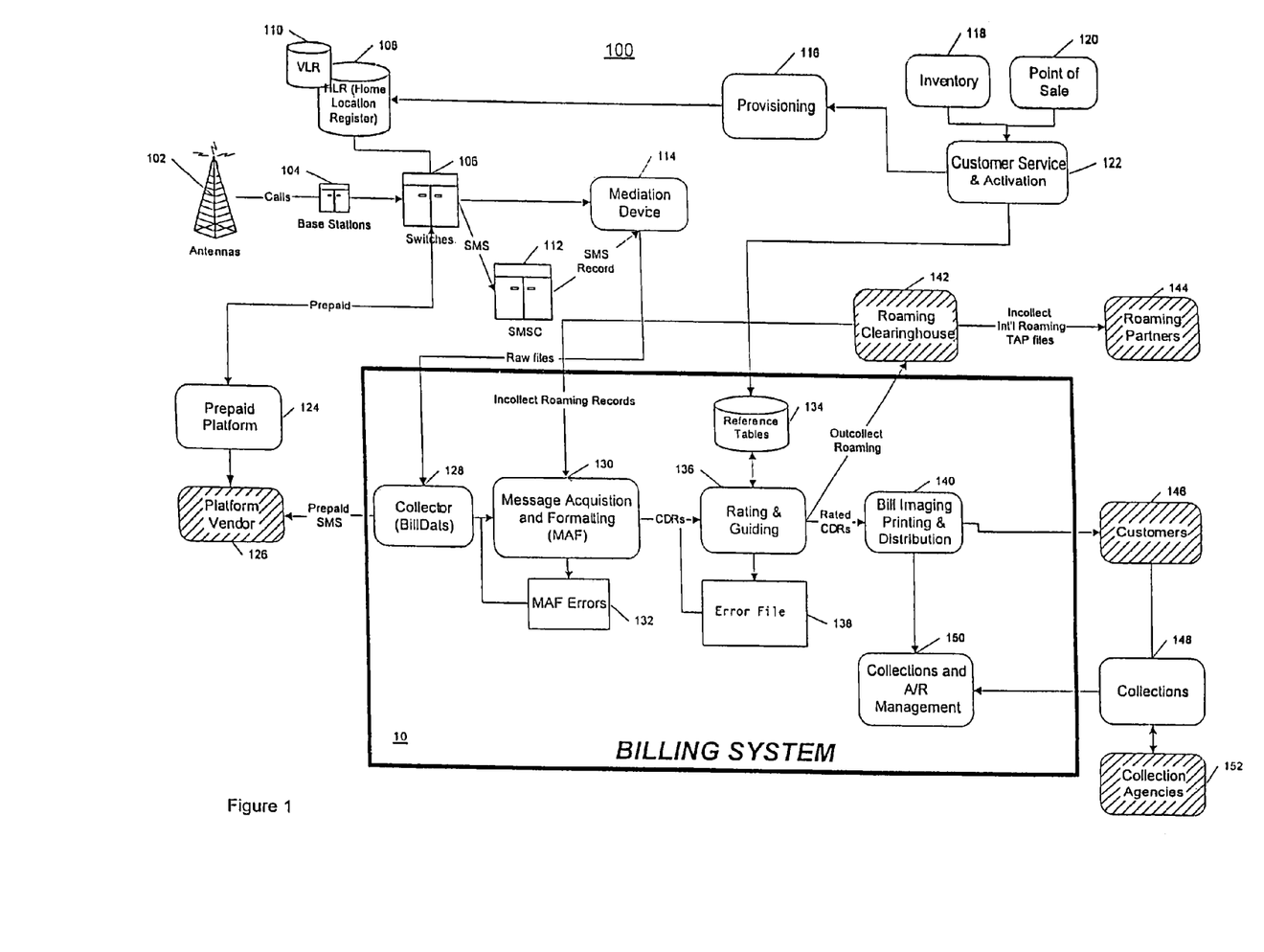
FIG. 1 illustrates a billing system coupled to a telecommunications switching system consistent with the present invention.

FIG. 1 illustrates a billing system 10 coupled to a telecommunications switching system consistent with the present invention. While the billing system 10 and method of the present invention may be implemented within a wide variety of telecommunications systems, for purposes of explanation, the billing system 10 will be described in relationship to the telecommunications system 100 of FIG. 1. Mobile phone calls or other data transactions occur between a mobile device, such as a cell phone, pager or personal digital assistant, and an antenna 102 over an air interface. These calls are partially managed by one or more interconnected base stations 104. Base stations 104 may comprise storage means, such as RAM memory, tape, or disc drives, to store call data records (CDR's).

Switches 106 interface with one or more base stations 104 and serve to direct calls and data to and from their destination and origination devices. Switches 106 may comprise storage means, such as RAM memory, tape, or disc drives, to store call data records generated by switches 106. In the switches 106, the call data records may be stored as a binary file. The switches 106 may be interfaced to a home location register (HLR) 108 that serves to maintain a customer database of customers who are provisioned on the telecommunications provider's network. In addition, a visitor location registry (VLR) 110 may also be maintained in the system 100 to keep a database of mobile platforms currently associated with that system 100.

Customer data is provisioned on an HLR 108 by a provisioning system 116 which is maintained by a customer service and activation system 122. The customer service and activation system 122 interfaces with an inventory system 118 and point of sale system 120. Thus, when a new customer is activated with a new mobile platform, inventory is decremented with a new order potentially placed to replace the mobile platform and the customer is provisioned on an HLR 108.

Prepaid customers are provisioned on a prepaid platform 124 which interfaces to switches 106. When a call is placed or received for a prepaid customer, the prepaid platform 124 is queried by the switches 106 before the call is initiated to ensure that the prepaid customer has the necessary balance to pay for the call.

Switches 106 may also interface to a short messaging service center (SMSC) 112, a meditation device 114, and a collector 128. SMSC 112 manages the sending and receiving of short messages over a switch 106. SMSC 112 may comprise storage means, such as RAM memory, tape, or disc drives, to store message data records. Message data records are similar to call data records in that they record pertinent information about text messages sent and received to and from a mobile platform. While the exemplary embodiment of the present invention is now directed to call data records, it is clear that the present invention is applicable to all manner of data records. By way of example and not limitation, a general packet radio service (GPRS) feature can generate packet data records that may be audited under the present invention.

A mediation device 114 may interface with the switches 106 and the SMSC 112 in order to record call data records. The mediation device may comprise storage means, such as RAM memory, tape, or disc drives, to store call data records. The mediation device 114 may transfer the call data records to the collector 128 for storage.

The collector 128, within billing system 10, may collect the raw call data records from the mediation device 114. The collector 128 may interface to a prepaid platform vendor 126 for decrementing a customer's prepaid account based on the call data records. The collector 128 may collect call data records from one or more mediation devices 114, switches 106, SMSC 112, or base stations 104.

Call data records are transferred from the collector 128 to the message acquisition and formatting (MAF) system 130 where the binary call data records are converted into a text format. Any binary call data records that cannot be converted into a text format are sent to a MAF error file 132 which may be fed back into the MAF 130 following intervention to correct the records. The MAF 130 also collects call data records from incoming roaming calls.

Following conversion in the MAF 130, the call data records are transferred to the rating and guiding system 136. The rating and guiding system 136, which houses the telecommunications provider's rules for analyzing the CDR, consults reference tables 134 to determine the appropriate charge rate for each call data record based on the customer to which the call data record is associated. Call data records which cannot be analyzed and charged are transferred to an error file 138. Within the error file 138, each CDR is re-analyzed until associated with an appropriate charge, or eventually rejected and purged. Call data records associated with a roaming customer are charged and transferred to a roaming clearinghouse system 142 for collection from a roaming partners system 144.

The charged call data records are transferred from the rating and guiding system 136 to a bill imaging, printing and distribution system 140 where they are converted into billed records and sent to customers 146. Every call data record that was originally generated should correspond to a billed record for non-roaming customer calls. Payment is received from customers 146 by collections 148, or collection agencies 152, to a collections and account receivables system 150. The bill generation chain, in this exemplary embodiment, may comprise the mediation devices 114, collector 128, MAF 130, and rating and guiding system 136.

The diligent telecommunications provider audits its billing system 10 to ensure its customers are accurately billed. All call data records typically appear as a billing record, and typically there should not be any billing records that do not originate as a call data record. In other words, customers should neither be undercharged nor overcharged. An audit system, consistent with the principles of the present invention, may perform a check of the bill generation chain, origination devices, and billing records to ensure that billing is properly occurring and, in cases of failure, attempt to localize the source of the error.

Figure 2:
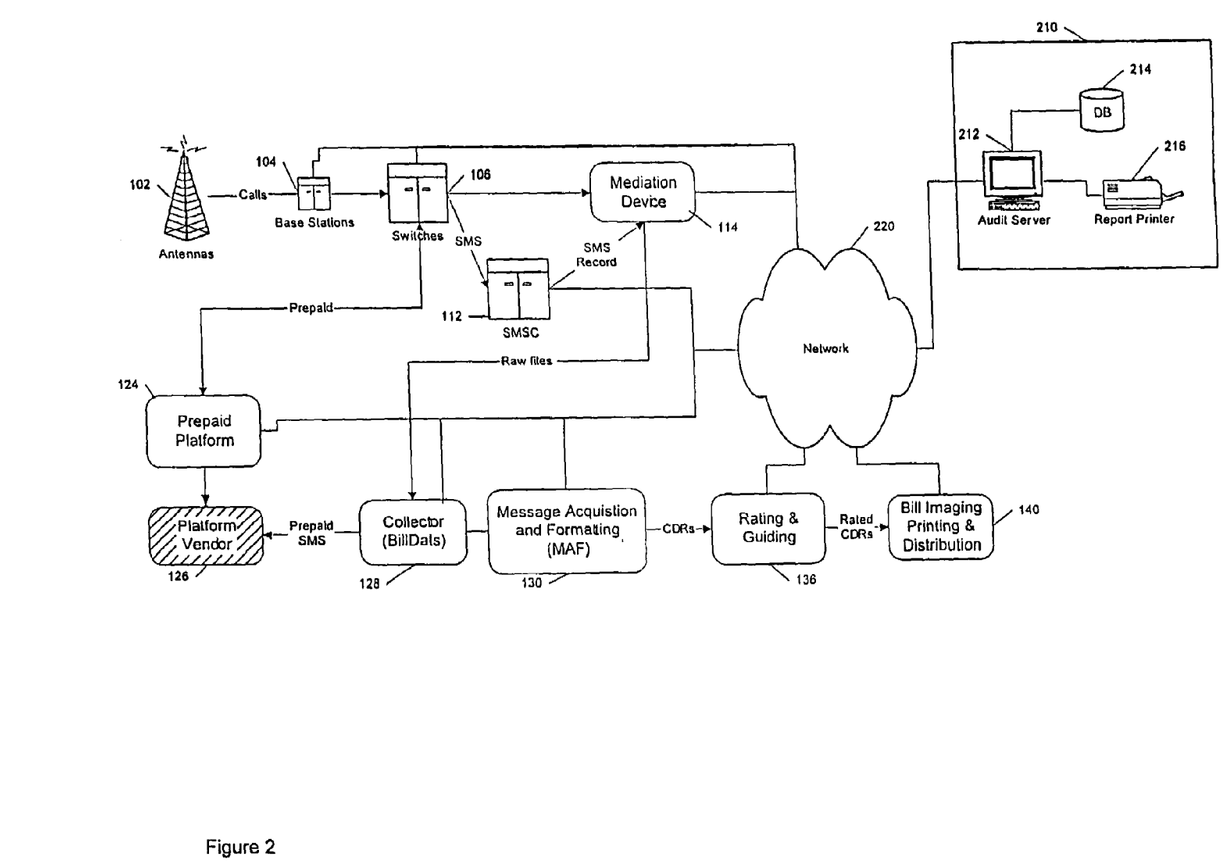
FIG. 2 illustrates an exemplary embodiment of an audit system consistent with the principles of the present invention.

FIG. 2 illustrates an exemplary embodiment of an audit system consistent with the principles of the present invention. An audit system 210 may comprise an audit server 212 in communication with an audit database 214 and a report printer 216. The audit system 210 may also comprise a computer having a microprocessor, RAM memory, and an internal hard drive for storage of an operating system and program data. In addition, audit system 210 may comprise an interface to a network 220 (including the Internet) for communication with telecommunications devices. Network 220 may be a local area network (LAN), a wide area network (WAN), or direct point to point connections between the audit server 212 and the telecommunications devices. In the exemplary embodiment of the present invention, network 220 interfaces with one or more devices from which call data records or billing records may be retrieved.

In the exemplary embodiment of the invention, the audit server 212 retrieves call data records via network 220 from one or more devices, such as base stations 104, switches 106, SMSC's 112, mediation devices 114, prepaid platform 124, collector 128, MAF 130, rating and guiding system 136, and bill imaging system 140. These devices are for illustrative purposes only, and those skilled in the art will appreciate that other devices may also contain call data records of interest in an auditing process. In addition, while the audit system 210 is discussed with reference to call data records, all manner of data collected from remote devices may also be retrieved and audited by the audit system 210. Thus, those skilled in the art will likewise appreciate that there are a number of variations of data provisioned within devices that would benefit from audit systems consistent with the principles of the present invention.

As audit server 212 collects call data records from the various devices it may perform conversions on this data to put it into a suitable form for analysis. For example, call data records may be converted from a raw binary form into a text form for storage and comparison. Such conversion would take place in the audit server 212 in a manner familiar to those skilled in the art. In addition, the call data records may be stored in a sequel (SQL) database on database 214 for ease of manipulation in the comparison process, explained below. The call data records are preferably stored such that the call records are related to the device from which they were gathered.

Exemplary embodiments of the audit server 212 perform a one-hundred percent bidirectional reconciliation through each phase of the billing process, comparing each call data record to its respective billing record and vice-versa. In performing a two-way check of the data, downstream call data records may be compared to upstream billing records and upstream billing records may be compared to downstream call data records. In addition, by tracing the path of the call data record through the generation chain, errors in the generation chain may be localized to a given device for troubleshooting and correction.

In further detail, the bill generation chain comprises one or more devices that facilitate the collection and aggregation of call data records, from origination devices—such as but not limited to switches, SMSC's and base stations, through billing devices—such as but not limited to bill imaging, printing and distribution devices. In accordance with the present invention: first data records are retrieved from an origination device, second data records are retrieved from a billing generation device, and billing records are retrieved from a billing device. Thereafter, the first data records are compared to the second data records and a first error log is generated, reflecting those data records that appear in the first data records but not in the second data records. Also, the second data records are compared to the billing records and a second error log is generated, reflecting those data records that appear in the second data records but not in the billing records. In other words, as call data records fail to pass through the generation chain, error logs for each device within the bill generation chain are created and updated; following the comparison, any billing records that do not correspond to call data are likewise reported in an error log for further resolution.

Figure 3:
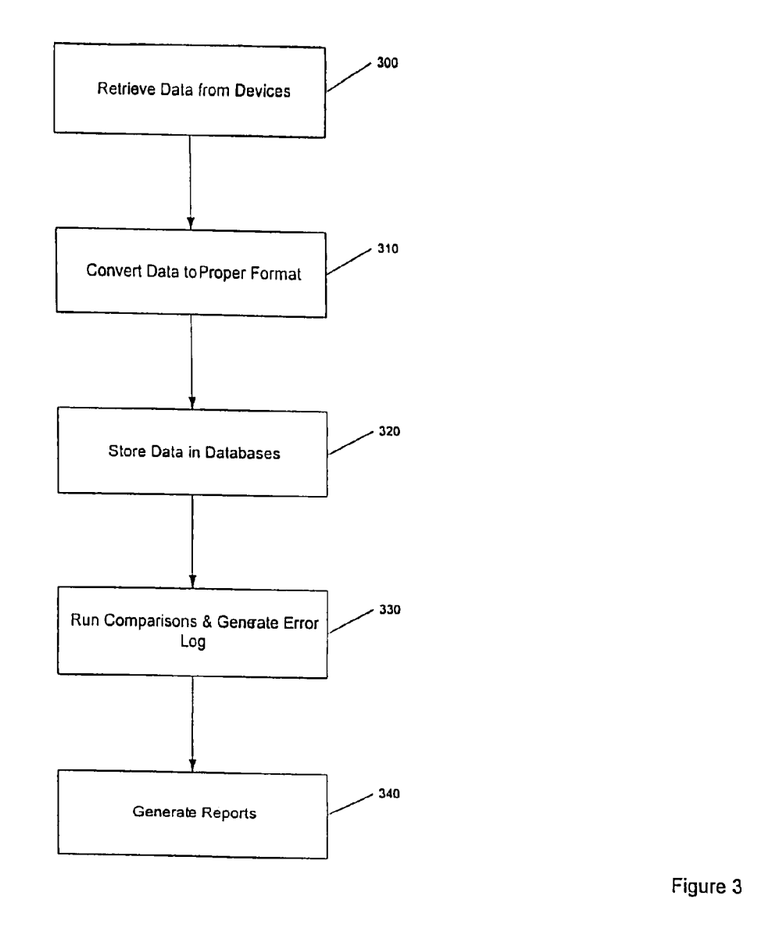
FIG. 3 illustrates a method of auditing a telecommunications system consistent with the principles of the present invention.

FIG. 3 illustrates a method of auditing a telecommunications system consistent with the principles of the present invention. At stage 300, data is retrieved from devices. Such data may include call record data, message record data, billing records, and other data suitable for audit analysis. The devices include origination devices, devices within the bill generation chain and billing devices. At stage 310, the call data records may be converted from a raw binary format or a text format into a format suitable for analysis, such as SQL formatted data. The data may also be left in a text format suitable for analysis.

At stage 320, the formatted call record data is stored in a database for use in the comparison process. At stage 330, the call records stored in the call record database are compared and error files may be generated. In an exemplary embodiment of the present invention, the call record data in the database is compared to the call record data of each generation device and to the billable record. As each item of call data record is identified, it is noted so that there is a one-to-one relationship between each call data record in each device. For example, call data record A in the switch is associated with call data record A in the collector. When performing the comparison, call data record A is then noted so that it cannot be associated with a different call data record. By assigning the one-to-one relationship, a single call data record will not be associated with more than one billable record and vice-versa.

Call data records in each device and billable records that are not associated throughout the system may be noted in an error log. For example, if a call data record is found in the first three devices in the generation chain, but is not found in the fourth device, an error log is entered in the third device noting that the call data record did not reach the fourth device.

At stage 340, reports may be generated noting auditing errors found within the billing or telecommunications system.

Figure 4:
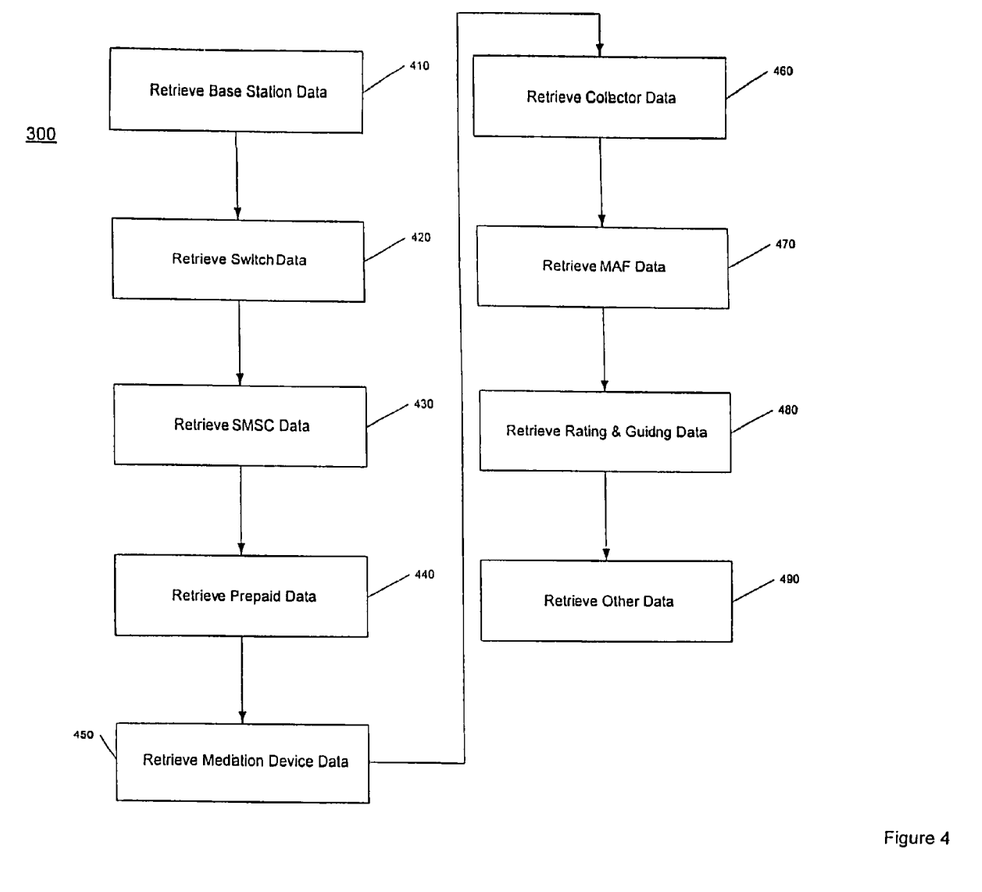
FIG. 4 illustrates an exemplary method of retrieving data from one or more devices in the method of auditing of FIG. 3.

FIG. 4 illustrates an exemplary method of retrieving data 300 from one or more devices in the method of auditing illustrated in FIG. 3. At stage 410, base station call record data may be retrieved. At stage 420, switch call record data may be retrieved. At stage 430, SMSC message record data may be retrieved. At stage 440, prepaid call record data may be retrieved. At stage 450, mediation device call record data may be retrieved. At stage 460, collector call record data may be retrieved. At stage 470, MAF call record data may be retrieved. At stage 480, call record data from rating and guiding system may be retrieved. At stage 490, other call record data may be retrieved. In addition, billing records may be retrieved at this point for use in the comparison process 330. Or, comparison process 330 may examine billing records from existing business systems without creating a duplicate database of records. While call record data has been shown in the exemplary method, other data amenable to auditing practice may be read and examined.

Figure 5:
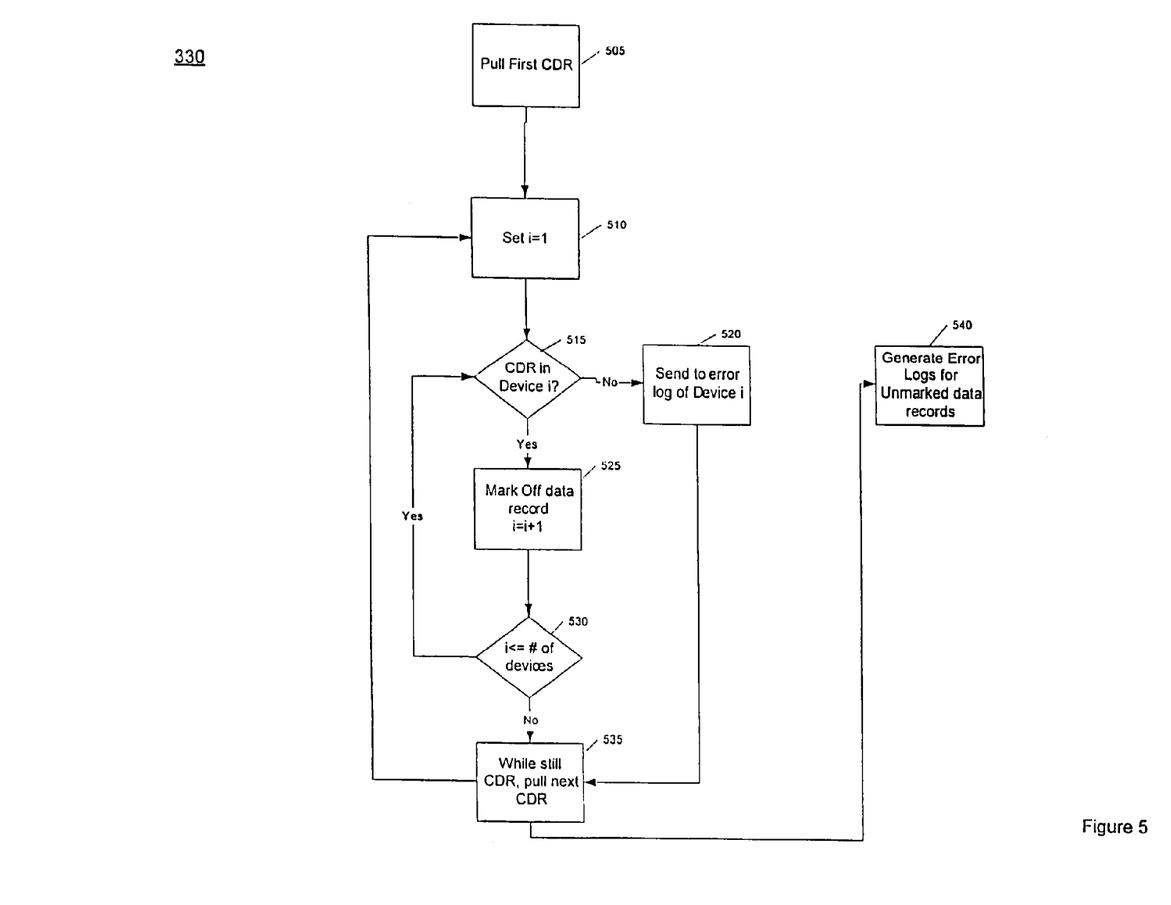
FIG. 5 illustrates an exemplary method of comparing billing records with call data records in the method of auditing of FIG. 3.

FIG. 5 illustrates an exemplary method of comparing billing records with call data records 330 in the method of auditing illustrated in FIG. 3. At stage 505, the first call data record is pulled from the previously generated database for an origination device, such as a switch. The method will trace the call data record as it propagates through the generation devices to become a billable record to audit and verify that the call data record resulted in the generation of a billing record. At stage 510, an index counter is set to 1.

Stages 515 through 530 will verify that the call data record appears in each billing generation device through the final billable record. At stage 515, a check is made of all of the call data records for device i to determine if the call data record appears in device i. If the call data record does not appear in device i, an error has probably occurred in the transmission of the call data record from the origination device to device i, so processing proceeds to stage 520 where an error is noted in the error log for device i-1, in this case the origination device. Because the call data record should not proceed further, processing jumps to stage 535 where the next call data record is pulled and the process continues.

Returning to stage 515, if the call data record is found in device i, at stage 525, the call data record in device i is noted as having been matched and noted for disqualification for any further matches that may occur. Thus a single call data record in device i cannot be matched to multiple call data records from previous devices. The device number, i, is also incremented. At stage 530, i is less than or equal to the number of devices in the generation chain including the billing record device, processing returns to stage 515, so that further devices up the chain can be verified.

When the call data record is verified throughout the generation chain and into the billable record, at stage 535, the next call data record is pulled from an origination device's database and flow continues to stage 510. In this manner, all origination call data records in the database are checked throughout all of the generation device databases through the billable record device. At stage 540, error logs are generated for each device noting call data records or billable records that are lost prior to reaching the next device and all call data records or billable records that were introduced without being generated by a previous device.

Figure 6:
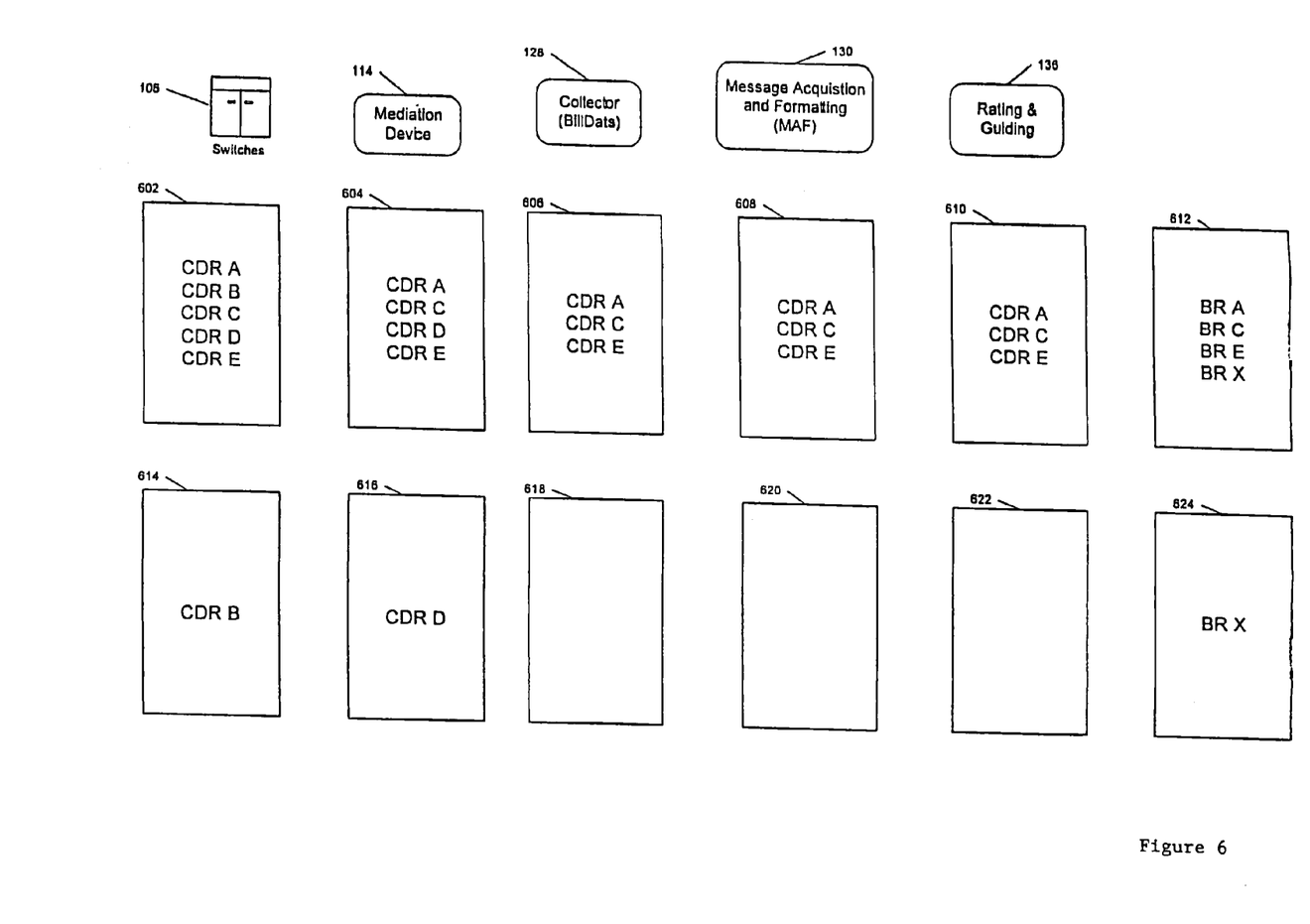
FIG. 6 illustrates a sample collection of data records and error reports generated by the method of FIG. 3.

FIG. 6 illustrates a sample collection of data records and error reports generated by the method illustrated in FIG. 3. In FIG. 6, a plurality of call record data and billable record databases 602–612 are illustrated. Stored in database 214, report databases 602–610 correspond, respectively, to switch 106 and generation devices 114–136. In switch CDR database 602, a plurality of call data records CDR A–CDR E are shown. In other words, five call data records were retrieved from switch 106. Mediation device CDR database 114 contains CDR A, CDR C, CDR D, and CDR E, illustrating that a call data record, CDR B was dropped between switch 106 and mediation device 114. Note that this halts the propagation of CDR B through the system.

Collector CDR database 606 contains CDR A, CDR C, and CDR E. Therefore, CDR D was dropped between the mediation device 114 and the collector 128. CDR databases 608 through 610 contain the same call data records because, in this example, no further records were lost. Billing record database 612 contains billing records BR A, BR C, BR E, and BR X. BR X appears but does not correspond to any call data records. Therefore, associated customers were overcharged for BR X and associated customers were undercharged for unbilled CDR B and CDR D.

The exemplary auditing system consistent with the principles of the present invention can generate error logs 614–624 showing where call data records were lost and the existence of billing records not associated with a call data record. Methods consistent with the principles of the present invention start with CDR A in database 602. That record would be checked in all upstream device databases and be found in each device in this example. However, when call data record 602 is checked, it is found missing in mediation device CDR database 604, so a transfer error is written to error database 614. This process continues for each CDR in database 602 generating the error logs 614–624.

Thus, the invention provides a system and method for auditing billing records in a telecommunications system by comparing each call data to its respective billing record, and vice-versa, for a one-hundred percent bi-directional reconciliation through each phase of the billing process. In accordance with the invention, the system and method retrieves first data records from an origination device and second data records from a billing generation device; retrieves billing records from a billing device; compares the first data records with the second data records and with the billing records; generates a first error log of data records that appear in the first data records but not in the second data records; and generates a second error log of data records that appear in the second data records but not in the billing records.

What is claimed is:

1. A method of auditing billing records in a telecommunications system having a billing chain comprising origination devices, billing generation devices, and a billing device, said method comprising:
   retrieving and storing a first set of call data records from an origination device;
   retrieving and storing a second set of call data records from a billing generation device;
   retrieving and storing a set of call billing records from a billing device;
   performing bi-directional reconciliation of each call data record from said first set of call data records, said second set of call data records and said set of call billing records so as to identify any call data records that do not correspond to a call billing record and any call billing records that do not correspond to a call data record; and
   generating an error report providing a record of (i) errors identified through said bidirectional reconciliation and (ii) a device of said billing chain associated with each error.

2. A computer-readable medium comprising computer-readable instructions which, when executed, performs the method of claim 1.

3. The method of claim 1, further comprising converting said first set of call data records from a raw binary form into a text form.

4. The method of claim 1, further comprising converting said second set of call data records from a raw binary form into a text form.

5. The method of claim 1, wherein said step of performing bi-directional reconciliation comprises:
   pulling a call data record from said first set of call data records;
   determining that said call data record from said first set of call data records corresponds to a call data record in said second set of call data records;
   noting said corresponding call data record in said second set of call data records such that a single call data record in said second set of call data records cannot be matched to multiple call data records from said origination device;
   determining that said call data record from said first set of call data records corresponds to a call billing record;
   noting said corresponding call billing record in said set of call billing records, such that a single call billing record cannot be matched to multiple call data records from said origination device;

repeating the process for each call data record from said first set of call data records; and generating an error report providing a record of: (i) call data records in said second set of call data records that are not noted as corresponding to a call data record in said first set of call data records; (ii) billing records that are not noted as corresponding to a call data record in said second set of call data records; (iii) call data records in said first set of call data records that do not correspond to any call data records in said second set of call data records; and (iv) call data records in said first and second sets of call data records that do not correspond to any call billing records.

6. A system for auditing billing records in a telecommunications system, comprising:

a computer;

an interconnected billing generation chain in communication with said computer, said billing generation chain including an origination device having a storage means having a first set of call data records, a billing generation device having a storage means having a second set of call data records, and a billing device having a set of call billing records;

a memory in communication with said computer, said memory comprising storage for a program module containing instructions operative to:

retrieve and store said first set of call data records from said origination device storage means;

retrieve and store said second set of call data records from said billing generation device storage means;

retrieve and store said set of call billing records from said billing device; and perform bi-directional reconciliation of each call data record from said first set of call data records, said second set of call data records and said set of call billing records so as to identify any call data records that do not correspond to a billing record and billing records that do not correspond to a call data record; and generate an error report providing a record of (i) errors identified through said bidirectional reconciliation; and (ii) a device of said billing generation chain associated with each error.

7. The system of claim 6, further comprising a printer in communication with said computer for printing said reports.

8. The system of claim 6, wherein said billing generation device is a message acquisition and formatting system for converting call data records into a form suitable for analysis.

9. The system of claim 6, wherein said billing generation device is a rating and guiding system that determines the appropriate charge rate for each data record.

10. The system of claim 9, wherein said billing device is a bill imaging printing and distribution system for converting call data records into call billing records.

11. The system of claim 6, wherein said billing generation device includes a mediation device and a collector; said mediation device for transferring call data records to said collector.

12. The system of claim 11, wherein said collector further comprises an interface to a prepaid platform vendor for decrementing a prepaid account.

13. The system of claim 6, wherein said program module instruction operative to perform bidirectional reconciliation comprises:

pulling a call data record from said first set of call data records;

determining that said call data record from said first set of call data records corresponds to a call data record in said second set of call data records;

noting said corresponding call data record in said second set of call data records such that a single call data record in said second set of call data records cannot be matched to multiple call data records from said origination device;

determining that said call data record from said first set of call data records corresponds to a call billing record;

noting said corresponding call billing record in said set of call billing records, such that a single call billing record cannot be matched to multiple call data records from said origination device;

repeating the process for each call data record from said first set of call data records; and generating an error report providing a record of: (i) call data records in said second set of call data records that are not noted as corresponding to a call data record in said first set of call data records; (ii) billing records that are not noted as corresponding to a call data record in said second set of call data records; (iii) call data records in said first set of call data records that do not correspond to any call data records in said second set of call data records; and (iv) call data records in said first and second sets of call data records that do not correspond to any call billing records.

* * * * *